United States Patent
Iwata (10) Patent No.: US 12,545,007 B2
(45) Date of Patent: Feb. 10, 2026

(54) NONWOVEN FABRIC USED FOR FOAMED ARTICLE REINFORCING MATERIAL, FOAMED ARTICLE REINFORCING MATERIAL, AND METHOD FOR PRODUCING NONWOVEN FABRIC USED FOR FOAMED ARTICLE REINFORCING MATERIAL

(71) Applicants: AETEC-ALPHA CO., LTD., Aichi-Ken (JP); TOYOTA TSUSHO CORPORATION, Aichi-ken (JP); TOYOTSU VEHITECS CO., LTD., Mie-ken (JP)

(72) Inventor: Kouji Iwata, Toyota (JP)

(73) Assignees: AETEC-ALPHA CO., LTD., Aichi-Ken (JP); TOYOTA TSUSHO CORPORATION, Aichi-Ken (JP); TOYOTSU VEHITECS CO., LTD., Mie-ken (JP)

( * ) Notice: Subject to any disclaimer, the term of this patent is extended or adjusted under 35 U.S.C. 154(b) by 0 days.

(21) Appl. No.: 18/700,267

(22) PCT Filed: Oct. 7, 2022

(86) PCT No.: PCT/JP2022/037640
§ 371 (c)(1),
(2) Date: Apr. 10, 2024

(87) PCT Pub. No.: WO2023/063257
PCT Pub. Date: Apr. 20, 2023

(65) Prior Publication Data
US 2024/0416616 A1    Dec. 19, 2024

(30) Foreign Application Priority Data

Oct. 14, 2021    (JP) .................... 2021-168789

(51) Int. Cl.
*B32B 5/02*       (2006.01)
*B29C 44/14*    (2006.01)
(Continued)

(52) U.S. Cl.
CPC .............. *B32B 5/245* (2013.01); *B29C 44/14* (2013.01); *B32B 5/022* (2013.01); *B32B 5/08* (2013.01);
(Continued)

(58) Field of Classification Search
CPC ..... B32B 5/245; B32B 5/022; B32B 38/0036; B32B 2262/124; B32B 2307/7376;
(Continued)

(56) References Cited

U.S. PATENT DOCUMENTS

| | | | |
|---|---|---|---|
| 6,642,160 B1* | 11/2003 | Takahashi | D04H 5/02 442/364 |
| 2014/0174934 A1* | 6/2014 | Meier | B01D 39/2017 55/486 |
| 2016/0207279 A1* | 7/2016 | Ichikawa | B32B 5/245 |

FOREIGN PATENT DOCUMENTS

| | | |
|---|---|---|
| JP | 2012-7260 A | 1/2012 |
| JP | 2012-82548 A | 4/2012 |

(Continued)

OTHER PUBLICATIONS

International Search Report for PCT/JP2022/037640, mailed Dec. 13, 2022.
(Continued)

*Primary Examiner* — Michael A Tolin
(74) *Attorney, Agent, or Firm* — MARSHALL, GERSTEIN & BORUN LLP (57) ABSTRACT

A nonwoven fabric used for a foamed article reinforcing material to be bonded to a foamed material to reinforce the foamed article is a single-layer material in which stacked
(Continued)

layers of a web are bonded together, has a thickness of 1 to 8 mm under a load of 7 g/cm², and has a delamination strength of 0.05 to 2.45 N/cm. The delamination strength is a value of the pulling force required to peel the bonded layers of the web apart.

1 Claim, 7 Drawing Sheets (51) Int. Cl.
| | |
|---|---|
| *B32B 5/08* | (2006.01) |
| *B32B 5/20* | (2006.01) |
| *B32B 5/24* | (2006.01) |
| *B32B 38/00* | (2006.01) |
| *D04H 1/4291* | (2012.01) |
| *D04H 1/435* | (2012.01) |
| *D04H 1/4382* | (2012.01) |
| *D04H 1/46* | (2012.01) |
| *B32B 41/00* | (2006.01) |

(52) U.S. Cl.
CPC ............ *B32B 5/20* (2013.01); *B32B 38/0036* (2013.01); *D04H 1/4291* (2013.01); *D04H 1/435* (2013.01); *D04H 1/43828* (2020.05); *D04H 1/43835* (2020.05); *D04H 1/46* (2013.01); *B32B 2041/04* (2013.01); *B32B 2262/0253* (2013.01); *B32B 2262/0284* (2013.01); *B32B 2262/124* (2021.05); *B32B 2262/144* (2021.05); *B32B 2305/08* (2013.01); *B32B 2305/22* (2013.01); *B32B 2307/7376* (2023.05)

(58) Field of Classification Search
CPC .... B32B 2262/0253; B32B 2262/0284; B32B 2305/08; B32B 2305/22; B32B 5/06; B32B 5/08; B32B 5/20; B32B 5/24; B32B 5/26; B32B 5/265; B32B 5/266; B32B 37/04; B32B 37/06; B32B 37/065; B32B 2262/0276; B32B 2262/12; B32B 2262/14; B32B 2262/144; B29C 44/12; B29C 44/1209; B29C 44/1271; B29C 44/14; B29C 44/145; B29C 44/146; D04H 1/4291; D04H 1/435; D04H 1/4374; D04H 1/4382; D04H 1/43825; D04H 1/43828; D04H 1/43835; D04H 1/46; D04H 1/48; D04H 1/485; D04H 1/498; D04H 1/54; D04H 1/541; D04H 1/5412; D04H 1/5418; D04H 1/544; D04H 1/558; D04H 1/559; D04H 1/70; D04H 1/72; D04H 1/732; D04H 1/74; D04H 3/007; D04H 3/009; D04H 3/011; D04H 3/102; D04H 3/105; D04H 3/14; D04H 3/147; D04H 3/153; D04H 5/02; D04H 5/06; D04H 18/00; D04H 18/02
See application file for complete search history.

(56) References Cited

FOREIGN PATENT DOCUMENTS

| | | | |
|---|---|---|---|
| JP | 2013-76179 | A | 4/2013 |
| JP | 2013-129950 | A | 7/2013 |
| JP | 2017-226936 | A | 12/2017 |
| JP | 2018031079 | A * | 3/2018 |
| WO | WO-2007/049627 | A1 | 5/2007 |
| WO | WO-2013047669 | A1 * | 4/2013 |

OTHER PUBLICATIONS

Decision to Grant a Patent issued in JP 2021168789, dated Jan. 11, 2024.

Notice of Reasons for Refusal issued in JP 2021168789, dated Dec. 14, 2023.

* cited by examiner

NONWOVEN FABRIC USED FOR FOAMED ARTICLE REINFORCING MATERIAL, FOAMED ARTICLE REINFORCING MATERIAL, AND METHOD FOR PRODUCING NONWOVEN FABRIC USED FOR FOAMED ARTICLE REINFORCING MATERIAL

TECHNICAL FIELD

The present disclosure relates to a nonwoven fabric used for a foamed article reinforcing material, a foamed article reinforcing material, and a method for producing a nonwoven fabric used for a foamed article reinforcing material.

BACKGROUND ART

An example of a foamed article reinforcing material is a nonwoven fabric that is bonded to a foamed urethane article (for example, Patent Literature 1). To produce such a foamed article, a reinforcing material is set in a mold, a foam urethane material is fed into the mold, and then the mold is closed. Then, the gas generated by the urethane foaming passes through the gaps between the fibers of the nonwoven fabric, joining the urethane foam to the reinforcing material.

An example of a reinforcing material is a seat pad used for a vehicle seat. The seat pad may be placed in contact with a metal component, such as a pipe frame or a spring. This is because the reinforcing material is used to prevent the foamed material from being damaged by local forces received from metal components.

CITATION LIST

Patent Literature

Patent Literature 1: Japanese Laid-Open Patent Publication No. 2012-82548

SUMMARY OF INVENTION

Technical Problem

In producing a foamed article, when the foam material permeating into the gaps between the fibers passes through the nonwoven fabric, the foam material is exposed on the surface of the article. When a metal member comes into contact with the exposed foam material, abnormal noise may be generated due to friction. To limit the generation of abnormal noise, a multilayer material in which nonwoven fabric layers are stacked may be used. This is to limit the passage of the foam material by incorporating a dense nonwoven fabric, which may be produced by a spunbond method or the like, as one of the nonwoven fabric layers. However, it is a problem that a multilayer material including a dense layer generally has poor formability.

It is an objective of the present disclosure to provide a nonwoven fabric used for a foamed article reinforcing material, a foamed article reinforcing material, and a method for producing a nonwoven fabric used for a foamed article reinforcing material.

Solution to Problem

According to one aspect of the present disclosure, a nonwoven fabric used for a foamed article reinforcing material to be bonded to a foamed material to reinforce a foamed article is a single-layer material in which stacked layers of a web are bonded together, has a thickness of 1 to 8 mm under a load of 7 $g/cm^2$, and has a delamination strength of 0.05 to 2.45 N/cm, and the delamination strength is a value of pulling force required to peel the bonded layers of the web apart.

DESCRIPTION OF EMBODIMENTS

Description of Embodiments of Present Disclosure

First, embodiments of the present disclosure are listed and described.

[1] A nonwoven fabric used for a foamed article reinforcing material to be bonded to a foamed material to reinforce a foamed article is a single-layer material in which stacked layers of a web are bonded together, has a thickness of 1 to 8 mm under a load of 7 $g/cm^2$, and has a delamination strength of 0.05 to 2.45 N/cm, and the delamination strength is a value of pulling force required to peel the bonded layers of the web apart.

In another example, a nonwoven fabric used for a foamed article reinforcing material to be bonded to a foamed material to reinforce a foamed article is a single-layer material in which stacked layers of a web are bonded together, has a thickness of 2.5 to 6 mm under a load of 7 $g/cm^2$, and has a delamination strength of 0.05 to 2.45 N/cm, and the delamination strength is a value of pulling force required to peel the bonded layers of the web apart.

When a nonwoven fabric is produced through needle punching, for example, needles with projections cause the fibers to entangle with one another, bonding the stacked layers the web together. The greater the value of delamination strength, the more firmly the fibers are bonded, and a higher punch density in needle punching increases the delamination strength. A nonwoven fabric with a high punch density includes many through-holes made by needle penetration. Accordingly, when a nonwoven fabric with a high punch density is bonded to a foamed material, the foam material can easily pass through the nonwoven fabric. Thus, the foam material is likely to be exposed on the surface of the article.

In the nonwoven fabric of the present disclosure, the layers of the web are bonded together to an extent that allows the layers of the web to be peeled apart when pulled, and the nonwoven fabric therefore has a delamination strength of 0.05 to 2.45 N/cm. The lower limit of the delamination strength of 0.05 N/cm is the minimum strength required to maintain the shape of the nonwoven fabric. The upper limit of the delamination strength of 2.45 N/cm is the maximum value at which the nonwoven fabric can peel apart with the shape of layers maintained. In other words, a delamination strength of less than the lower limit of 0.05 N/cm indicates that the nonwoven fabric is difficult to use, and a delamination strength of greater than the upper limit of 2.45 N/cm indicates that the layers of the web cannot be peeled apart into layers. As such, with a conventional nonwoven fabric, an attempt to peel the layers of the web apart would fail to peel them apart in the thickness direction with the shape of layers maintained.

The thickness of the nonwoven fabric of the present disclosure may be 1 to 8 mm under a load of 7 g/cm$^2$, or 2.5 to 6 mm under a load of 7 g/cm$^2$. A thicker nonwoven fabric limits passage of the foam material but has lower processability in shaping. More specifically, a thickness of less than 1 mm facilitates passage of the foam material, whereas a thickness of greater than 8 mm compromises the processability. In this regard, when the nonwoven fabric with the above delamination strength has a thickness of 1 to 8 mm under a load of 7 g/cm$^2$, limited exposure of the foam material and good processability can both be achieved.

Also, a nonwoven fabric of a multilayer material limits passage of the foam material but has lower processability in shaping. A nonwoven fabric with the delamination strength described above appropriately limits passage of the foam material, even if the nonwoven fabric is a single-layer material. Additionally, the nonwoven fabric has excellent processability because it is a single layer. Moreover, a single-layer material is typically less expensive than a multilayer material and is thus more economical.

The web used to produce this nonwoven fabric is not limited to be formed through needle punching, but can also be formed using a machine of air-laid system, which arranges short fibers using an air stream. When a machine of air-laid system is used, the nonwoven fabric of the present disclosure can be produced by adjusting at least one of the heating temperature, compression distance, and compression time.

[2] The web may include 20% to 60% by weight of polyethylene terephthalate fibers and 40% to 80% by weight of polypropylene fibers.

Polypropylene (PP) has a lower specific gravity than polyethylene terephthalate (PET). The inclusion of PP therefore allows the number of fibers to be increased without increasing the weight. Increasing the number of fibers forming the nonwoven fabric limits passage of the foam material.

[3] The polyethylene terephthalate fiber may have a core-sheath structure, and the core-sheath structure may include a core and a sheath having a lower melting point than the core.

According to this configuration, the sheaths melt when heated, bonding the fibers together. At the same time, the cores, which resist melting, maintain the strength of the fibers.

[4] The nonwoven fabric may include a first surface that is heat-treated, a second surface that is opposite to the first surface and heat-treated, and internal fibers that are between the first surface and the second surface and are not heat-treated.

Since the nonwoven fabric is processed such that the bonding of the layers of the web is not strong, its surface tends to have a nap. Furthermore, if the internal fibers are heat-treated, the nonwoven fabric would be hard and have poor formability. With the nonwoven fabric of the present disclosure, only the surfaces are heat-treated, limiting formation of a nap. Moreover, since the internal fibers between the first and second surfaces are not heat-treated, good processability is maintained.

[5] A foamed article reinforcing material formed from the nonwoven fabric. In particular, a foamed article reinforcing material obtained by shaping the above-described nonwoven fabric by a shaping process that involves heating.

Shaping the nonwoven fabric with high formability provides a reinforcing material with high shaping accuracy. In particular, the high processability of the above nonwoven fabric is useful in three-dimensionally shaping a reinforcing material by a shaping process that involves heating.

[6] A method for producing a nonwoven fabric used for a foamed article reinforcing material includes processing stacked layers of a web into a single-layer material by bonding the layers of the web together through needle punching, and applying heat treatment only to a surface of the single-layer material, in which the nonwoven fabric has a thickness of 1 to 8 mm under a load of 7 g/cm$^2$, the nonwoven fabric has a delamination strength of 0.05 to 2.45 N/cm, and the delamination strength is a value of pulling force required to peel the bonded layers of the web apart.

In another example, a method for producing a nonwoven fabric used for a foamed article reinforcing material includes: processing stacked layers of a web into a single-layer material by bonding the layers of the web together through needle punching; and applying heat treatment only to a surface of the single-layer material, wherein the nonwoven fabric has a thickness of 2.5 to 6 mm under a load of 7 g/cm$^2$, the nonwoven fabric has a delamination strength of 0.05 to 2.45 N/cm, and the delamination strength is a value of pulling force required to peel the bonded layers of the web apart.

By adjusting the punch density when bonding the layers of the web together through needle punching, a single-layer material having a delamination strength of 0.05 to 2.45 N/cm can be formed. Also, by applying heat treatment only to the surface of the single-layer material, the thickness is adjusted to 1 to 8 mm under a load of 7 g/cm$^2$. The heat-treated surface is less likely to have a nap, which would otherwise result from a low punch density. At this time, if the nonwoven fabric is heated to the inside, the internal fibers of the nonwoven fabric are altered by the heat, increasing the rigidity of the nonwoven fabric. A nonwoven fabric with increased rigidity has poor processability. As such, when heat treatment is applied only to the surface of a nonwoven fabric without heating the internal fibers, this nonwoven fabric has excellent formability.

Details of Embodiments of Present Disclosure

Figure 1:
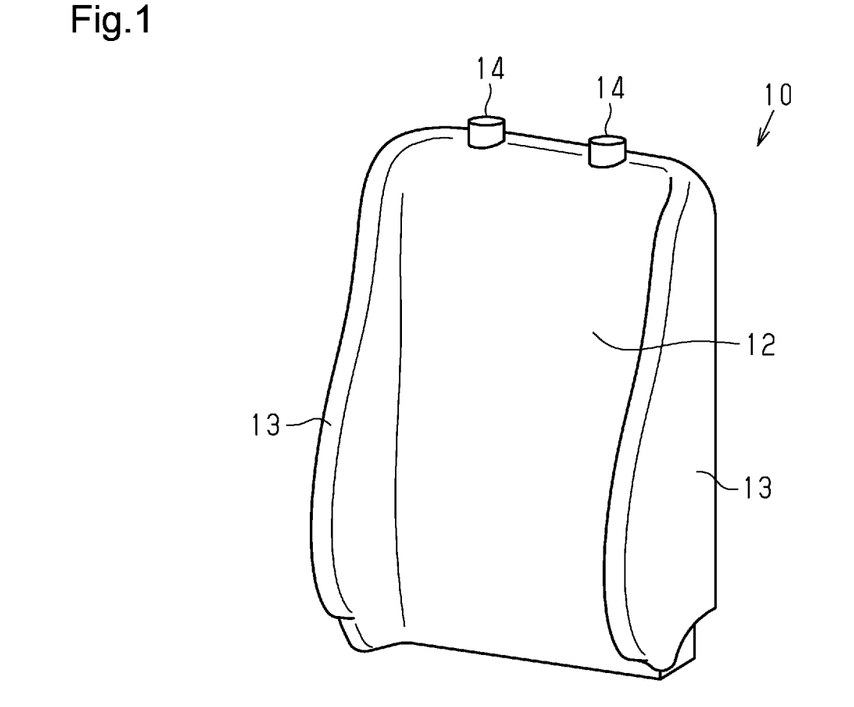
FIG. 1 is a perspective view of a reinforcing material according to an embodiment.

As shown in FIG. 1, a foamed article reinforcing material 10 according to one aspect of the present disclosure may be a seat pad for reinforcing a cushioning material of an automobile seat, for example. The cushioning material is an example of a foamed article 19 (see FIG. 4). The foamed article 19 is not limited to a seat pad, and may be a cushioning material for furniture.

The reinforcing material 10 may include a back portion 12, which corresponds to the surface of the backrest, two side portions 13, which project frontward of the vehicle from the left and right sides of the back portion 12, and two through-holes 14, which correspond to the attachment points of the headrest. The reinforcing material 10 may be obtained by shaping or sewing the nonwoven fabric 11 shown in FIG. 2. The shaping may be performed by any method such as press forming or vacuum forming.

Figure 2:
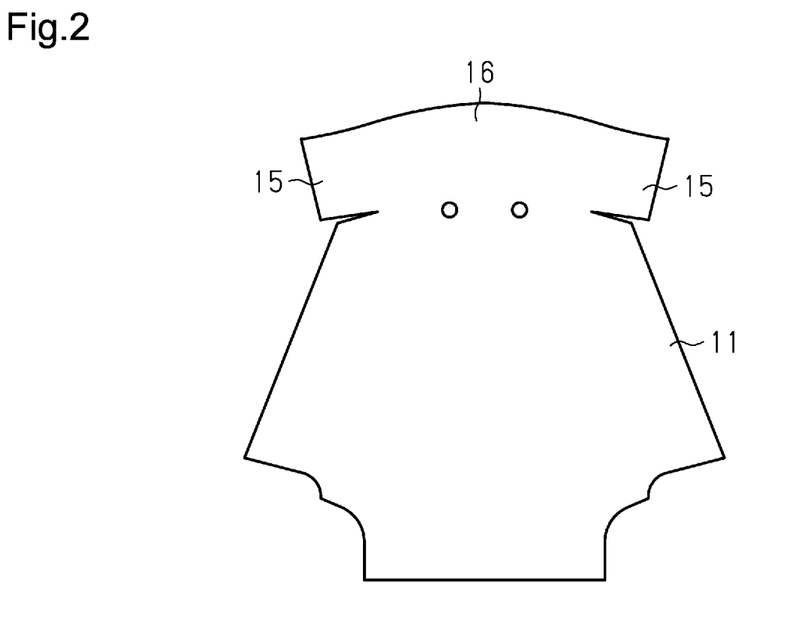
FIG. 2 is a plan view of a nonwoven fabric before being shaped into the reinforcing material of FIG. 1.

As shown in FIG. 2, the nonwoven fabric 11 may be obtained by cutting a nonwoven fabric sheet 33 (see FIG. 7) into a desired shape, such as the shape of a backrest of an automobile seat, for example. The nonwoven fabric 11 may include a central wrap-around portion 15 and two side wrap-around portions 16. The central wrap-around portion 15 is a section that wraps around the back surface of the back portion 12 during shaping. The side wrap-around portions 16 are sections that wrap around the back surfaces of the side portions 13 during shaping.

The nonwoven fabric 11 of the present disclosure is a single-layer material produced by a needle punching method. Specifically, layers of a web made of short fibers are stacked, and the fibers of these layers are entangled by reciprocating motion of metal needles to form a single-layer material. The number of layers of web to be stacked may be seven, but the number is not limited to this and can be modified freely.

Figure 3:
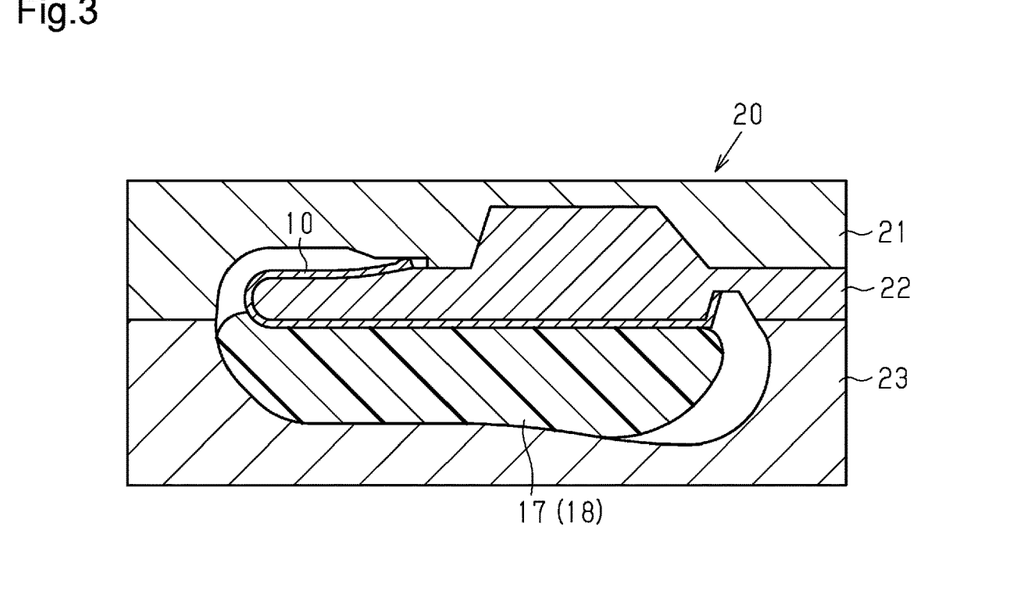
FIG. 3 is a cross-sectional view illustrating a method for producing a foamed article using the reinforcing material of FIG. 1.

As shown in FIG. 3, the reinforcing material 10 may be shaped using a mold 20. In this mold 20, the reinforcing material 10 may be bonded to a foamed material 18. The mold 20 may include an upper mold 21, a core mold 22, and a lower mold 23. The reinforcing material 10 may be set so as to cover the core mold 22, for example. Then, a foam material 17, such as urethane, containing a foaming agent is injected into the mold 20. As a result, the foamed material 18 is foam-molded. The reinforcing material 10 provides a gap for venting gas in the mold 20 during foam-molding of the foamed material 18.

Figure 4:
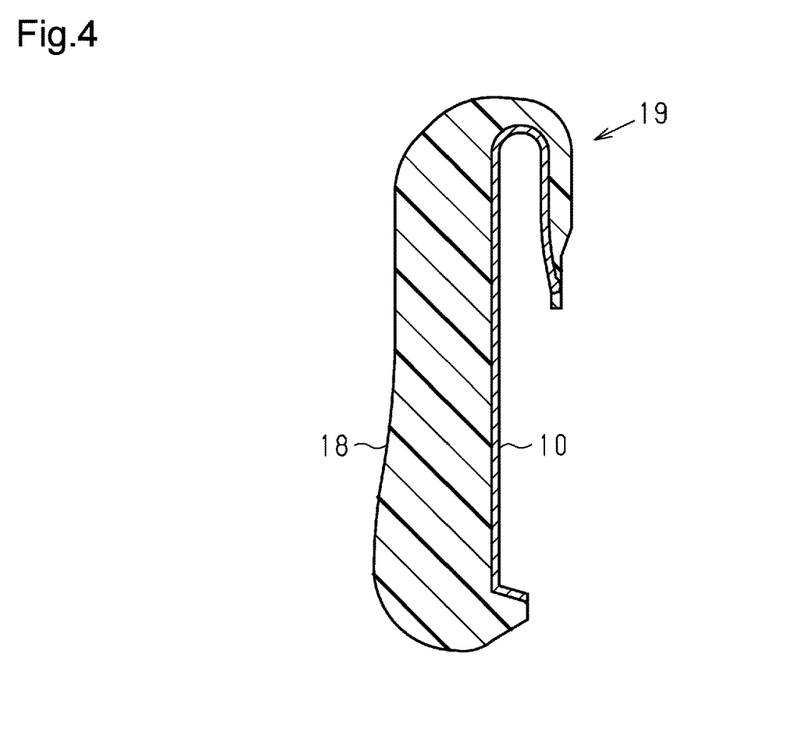
FIG. 4 is a cross-sectional view of a foamed article produced by the method of FIG. 3.

As shown in FIG. 4, the foamed article 19 may include a foamed material 18 and a reinforcing material 10 bonded to the foamed material 18. The reinforcing material 10 may be arranged to protect the surface of the foamed material 18. The reinforcing material 10 may be placed in the section of the foamed article 19 that comes into contact with metal components, such as a pipe frame or a spring. The presence of the reinforcing material 10 limits abnormal noise, which would otherwise be generated by rubbing between the foamed material 18 and metal components.

[Method for Producing Nonwoven Fabric]

Figure 5:
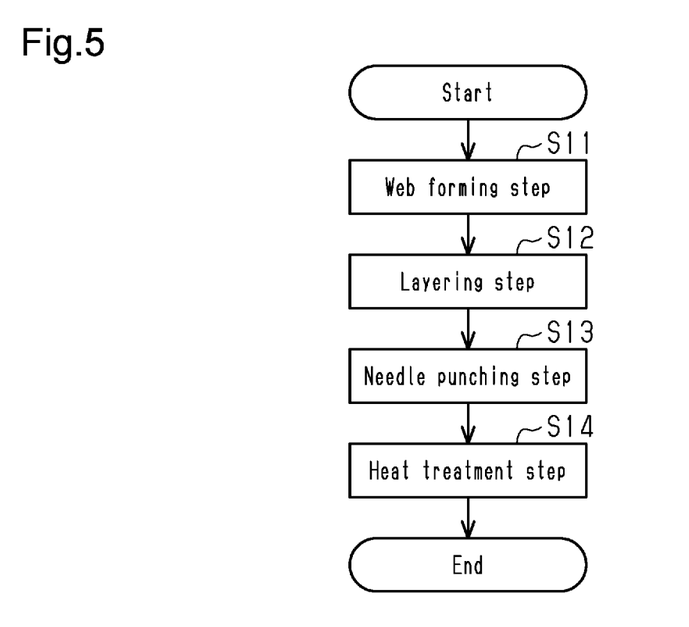
FIG. 5 is a flowchart showing a method for producing the nonwoven fabric of FIG. 2.

FIG. 5 shows an example of a method for producing the nonwoven fabric 11.

First, a web 31 (see FIG. 6) is formed in the web forming step of step S11. The web 31 is formed by arranging short fibers, which are at least either of polyethylene terephthalate fibers or polypropylene fibers, by machine or air flow.

Figure 6:
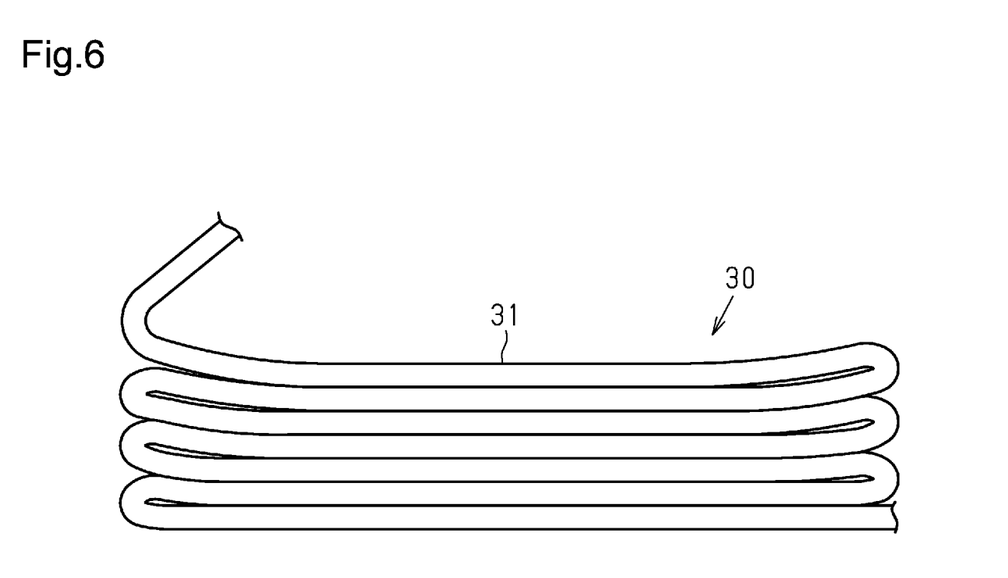
FIG. 6 is a schematic view showing the layering step of FIG. 5.

The web 31 may include 20% to 60% by weight of polyethylene terephthalate (PET) fibers and 40% to 80% by weight of polypropylene (PP) fibers. In one example, PP fibers may be 55% by weight, and PET fibers may be 45% by weight. The basis weight of the nonwoven fabric 11 may be, for example, 50 to 500 g/m$^2$, or 80 to 250 g/m$^2$, and more specifically, 140 g/m$^2$.

The PP fibers may be mixed fibers of different thicknesses. Using thin fibers increases the number of fibers without changing the weight, thereby limiting the passage of the foam material 17. PET fibers may have a core-sheath structure. The core-sheath structure may include a core and a sheath having a lower melting point than the core. The melting point of the sheath material may be about 110° C., for example. The melting point of these fibers may be modified depending on the processing method such as shaping, for example.

As shown in FIG. 6, the stacking step of step S12 forms a stacked material 30 by stacking multiple layers, for example, seven layers, of a web 31. The stacking may be formed by folding a continuous elongate web 31 into layers. Layers of the web 31 may be continuously stacked while the stacked material 30 is transported in a transport direction to be processed continuously.

Figure 7:
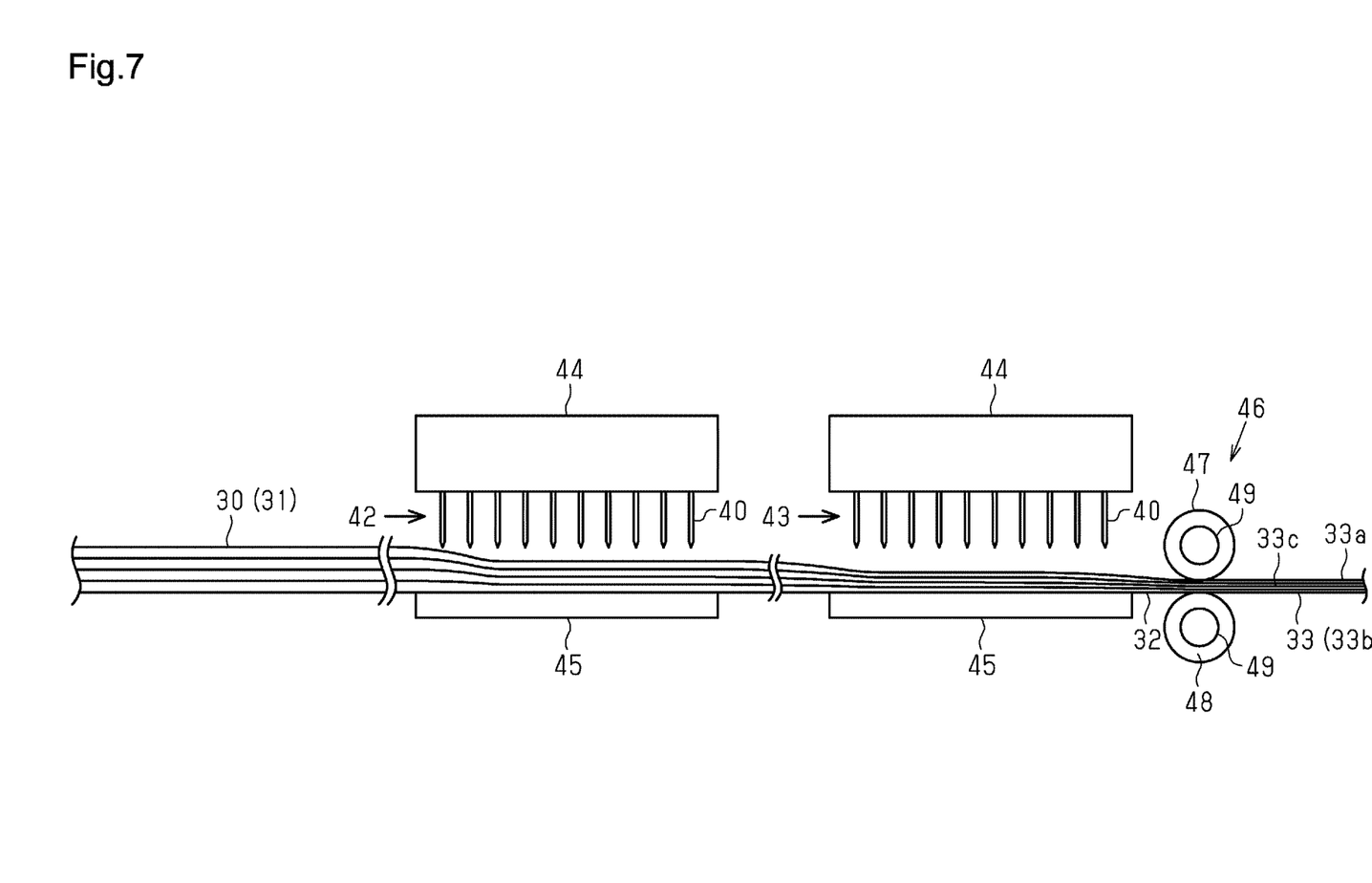
FIG. 7 is a schematic view illustrating the needle punching step and the heat treatment step of FIG. 5.

As shown in FIG. 7, the needle punching step of step S13 performs needle punching that repeatedly pierces the stacked material 30 with multiple needles 40. In the needle punching step, the punch density of needle punching is set to be low so that the delamination strength is 0.05 to 2.45 N/cm. The delamination strength is the value of the pulling force required to peel the bonded layers of the web 31 apart. The method for measuring the delamination strength will be described below.

Figure 8:
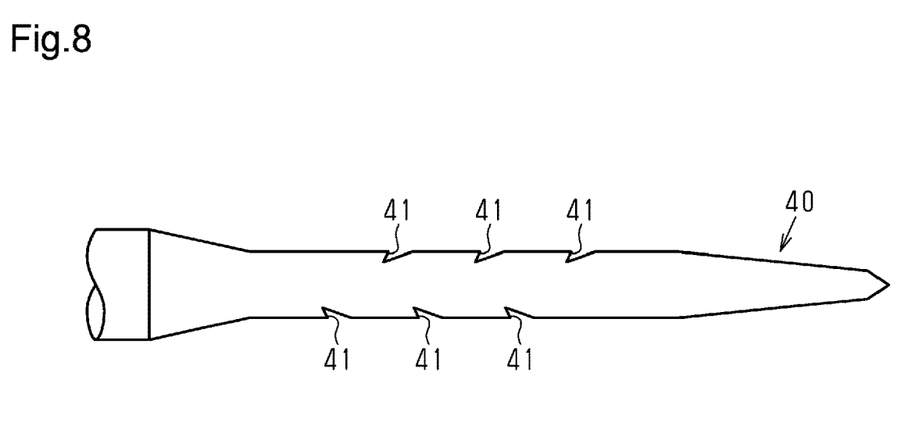
FIG. 8 is a side view of a needle used in the needle punching step of FIG. 7.

As shown in FIG. 8, each needle 40 has projections 41.

As shown in FIG. 7, the needle 40 repeatedly moves back and forth, penetrating the stacked material 30 in forward motion, and being pulled out from the stacked material 30 in backward motion. The projections 41 (see FIG. 8) catch fibers in this reciprocating movement, causing the fibers to be entangled between the layers of the web 31, thereby converting the stacked layers of the web 31 into a single-layer material 32.

One or more support beds 45 and one or more moving devices 44 facing the support beds 45 may be arranged along the transport path of the stacked material 30. Each moving device 44 may hold multiple needles 40. For example, two moving devices 44 may be arranged along the transport path.

The needle 40 may be inserted only from one side of the stacked material 30 being transported on the support beds 45. Also, multiple, for example, two, needle groups 42 and 43 may be arranged along the transport path of the stacked material 30. The needle groups 42 and 43 may be held by the respective moving devices 44. The operations of the needle groups 42 and 43 may be different from each other. For example, the needle groups 42 and 43 may differ in the depth of penetration of the needles 40 or the number of penetrations.

In one example, the needle density (number of penetrations) of the first needle group 42 may be 50 needles/cm$^2$, and the needle density (number of penetrations) of the second needle group 43 may be 75 needles/cm$^2$. Alternatively, the needle density of the first needle group 42 may be 50 needles/cm$^2$ and the needle density of the second needle group 43 may be 75 needles/cm$^2$.

In one example, the needle penetration depth of the first needle group 42 may be 9 mm, and the needle penetration depth of the second needle group 43 may be 3 mm. The needle penetration depth is the length of the distal end of the needle 40 that passes through the support bed 45. When the needle penetration depth is shallow, the number of projections 41 passing through the web 31 is reduced. Accordingly, the second needle group 43, which has a shallow needle penetration depth, has a lower effect of entangling the fibers with each other than the first needle group 42. The needle penetration depth of the second needle group 43 may be so shallow that the projections 41 do not catch fibers. This reduces the effect of entangling fibers.

In the heat treatment step of step S14, a calender 46 is used to heat-treat only the surfaces of the single-layer material 32 such that the thickness becomes 1 to 8 mm under a load of 7 g/cm$^2$. The calender 46 may include rolls 47 and 48, which sandwich the single-layer material 32, and one or more heating devices 49, which heat the rolls 47 and 48. The two heating devices 49 may be arranged to heat the respective rolls 47 and 48. The surface temperature of the heating rolls 47 and 48 may be 130° C., for example. The distance between the rolls 47 and 48 is set to a distance that does not crush the single-layer material 32. The distance between the rolls 47 and 48 may be 4 mm, for example. The transport speed of the single-layer material 32 transported between the rolls 47 and 48 may be 5 m/min, for example.

The heat treatment converts the single-layer material 32 into a nonwoven fabric sheet 33. The nonwoven fabric sheet 33 has a first surface 33$a$, which is heat-treated, a second surface 33$b$, which is heat-treated and opposite to the first surface 33$a$, and internal fibers 33$c$, which are between the first surface 33$a$ and the second surface 33$b$ and are not heat-treated.

The purpose of the heat treatment is to remove a nap from the surface of the single-layer material 32, and not to heat the internal fibers 33$c$. As such, the heating temperature, the distance between the rolls 47 and 48, and the transport speed in the heat treatment step may be modified to any values that achieve a thickness of 1 to 8 mm under a load of 7 g/cm$^2$, provided that the heat treatment does not affect the inside of the single-layer material 32.

Through the above steps S11 to S14, a nonwoven fabric sheet 33 having a thickness of 1 to 8 mm under a load of 7 g/cm$^2$ and a delamination strength of 0.05 to 2.45 N/cm is produced. The nonwoven fabric sheet 33 may be wound into a roll. The winding direction agrees with the transport direction during production. The nonwoven fabric sheet 33 is cut into a desired shape and thus becomes the nonwoven fabric 11 (see FIG. 2). The nonwoven fabric 11 has substantially the same properties as the nonwoven fabric sheet 33.

[Method for Shaping Reinforcing Material]

An example of a method for producing the reinforcing material 10, particularly a method for shaping the reinforcing material 10, is now described.

Figure 9:
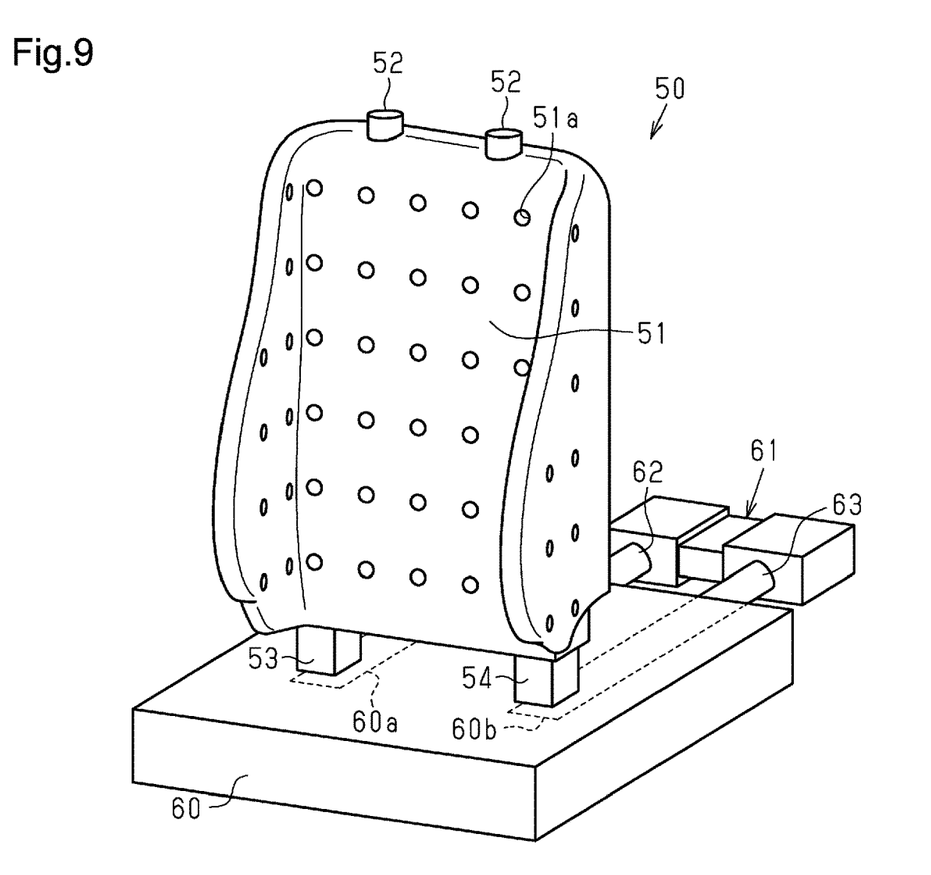
FIG. 9 is a perspective view of a shaping device for shaping the reinforcing material of FIG. 1.

A shaping device 50 for the reinforcing material 10 shown in FIG. 9 includes a shaping die 51, legs 53 and 54, a base 60, and an air supply/discharge unit 61. The shaping die 51 has an internal space and air holes 51$a$ communicating with the internal space. The shaping die 51 may have two cylindrical portions 52 at positions corresponding to the headrest. The shaping die 51 may be supported by the base 60 through the air supply leg 53 and the discharge leg 54.

The base 60 includes therein an air supply passage 60$a$ and a discharge passage 60$b$. The air supply passage 60$a$ and the discharge passage 60$b$ may communicate with the internal space of the shaping die 51 through the air supply leg 53 and the discharge leg 54, respectively. The air supply passage 60$a$ and the discharge passage 60$b$ may communicate with the air supply/discharge unit 61 through an air supply pipe 62 and a discharge pipe 63, respectively. The air supply/discharge unit 61 may be configured to supply heated steam or heated air through the air supply pipe 62. The air supply/discharge unit 61 may also be configured to draw air through the discharge pipe 63.

Figure 10:
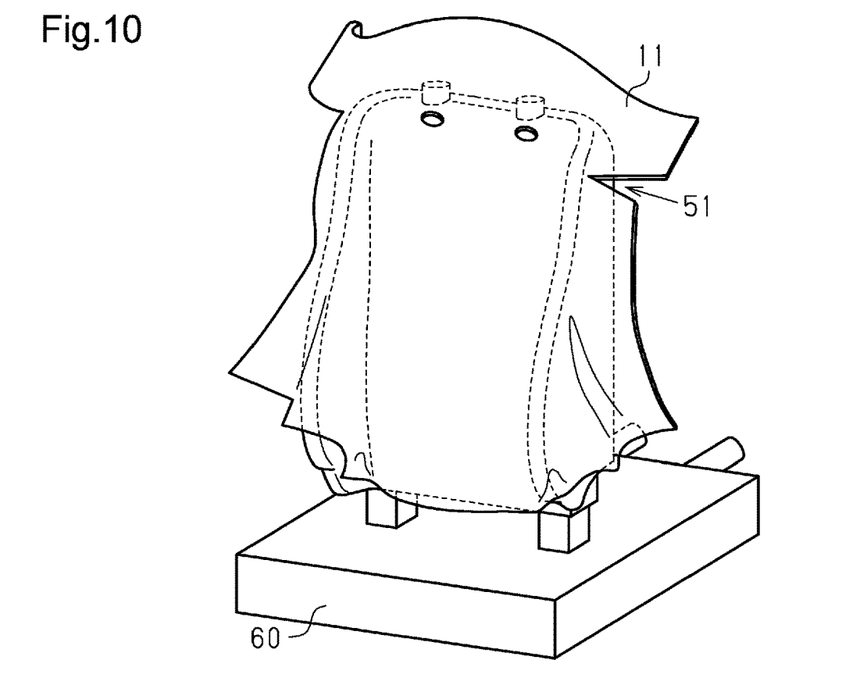
FIG. 10 is a perspective view showing how a nonwoven fabric is placed over the shaping device of FIG. 9.

In the covering step shown in FIG. 10, the nonwoven fabric 11 to be shaped is placed on the shaping die 51.

Figure 11:
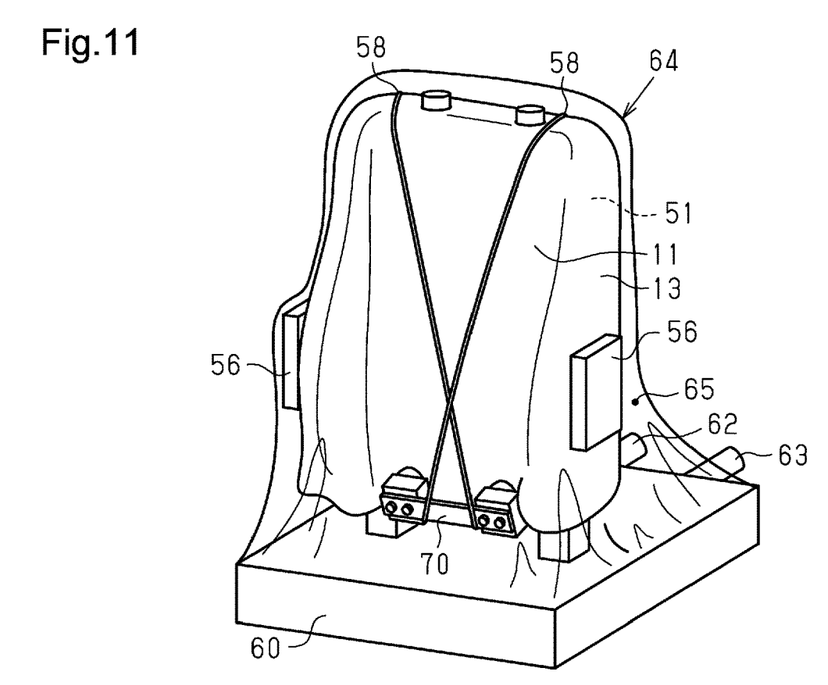
FIG. 11 is a perspective view showing how the nonwoven fabric is shaped using the shaping device of FIG. 9.

As shown in FIG. 11, the shaping device 50 may further include a cover member 64, a first auxiliary cover 70, and two second auxiliary covers 56. The first auxiliary cover 70 may be placed between the air supply leg 53 and the discharge leg 54.

Figure 12:
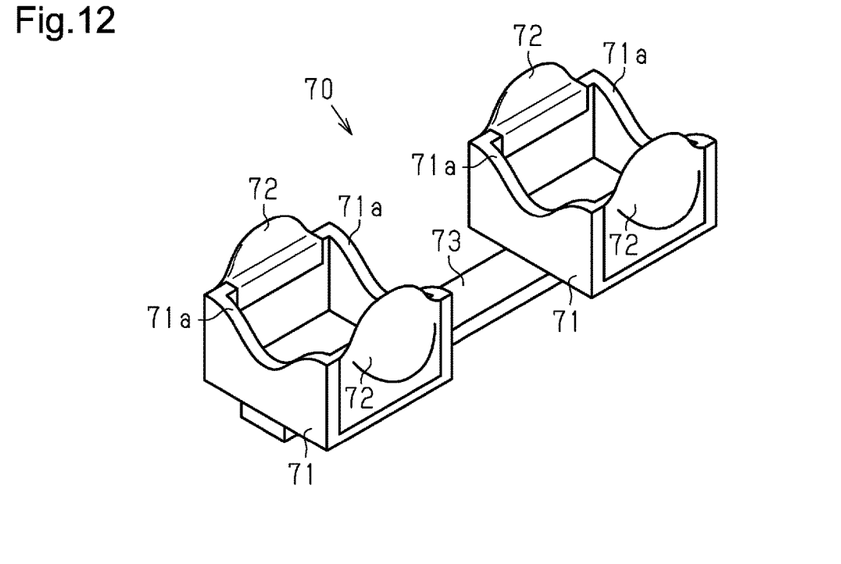
FIG. 12 is a perspective view of a first auxiliary cover of the shaping device of FIG. 9.

As shown in FIG. 12, the first auxiliary cover 70 includes two cover bodies 71, four magnets 72, and a coupling bar 73. The coupling bar 73 couples the two cover bodies 71. Each cover body 71 has edge regions 71$a$ curved to conform to the lower end of the shaping die 51. Two magnets 72 are attached to each cover body 71 so as to be opposed to each other. Magnets (not shown) may be placed in the lower end region of the shaping die 51. The first auxiliary cover 70 may be fixed to the shaping die 51 by the magnets 72 so as to fix the lower end of the nonwoven fabric 11 covering the shaping die 51 to the shaping die 51 in the first auxiliary cover fixing step.

As shown in FIG. 11, in the second auxiliary cover fixing step, the two second auxiliary covers 56 are fixed to the sides of the shaping die 51 using fixing members (not shown), such as magnets or screws, so as to press the side portions 13 of the nonwoven fabric 11. The nonwoven fabric 11 may also be fixed to the shaping die 51 with strings 58. In the space forming step, the cover member 64 covers the shaping die 51 and is also fixed to the base 60 at its edge, thereby forming a closed space 65. At this time, the auxiliary covers 56 and 70 are located in the closed space 65.

After the space forming step, in the air supply step or the heating step, the air supply/discharge unit 61 supplies heated steam or heated air to the inside of the shaping die 51 through the air supply pipe 62, the air supply passage 60$a$, the air supply leg 53, and the air holes 51$a$. This heats the nonwoven fabric 11 and the shaping die 51. At this time, the supplied heated steam expands the cover member 64.

Subsequently, in the discharge step, the air supply/discharge unit 61 discharges the air from the closed space 65 by drawing air through the discharge pipe 63, the discharge passage 60$b$, the discharge legs 54, and the air holes 51$a$. Thus, the expanded cover member 64 contracts and is attracted to the shaping die 51. As a result, the nonwoven fabric 11, which is heated and thus has higher plasticity, adheres to the shaping die 51 and is formed into a shape that conforms to the outer shape of the shaping die 51. The reinforcing material 10 shown in FIG. 1 is shaped by the shaping method including the covering step, the first auxiliary cover fixing step, the second auxiliary cover fixing step, the space forming step, the air supply step (heating step), and the discharge step.

The covered sections of the nonwoven fabric 11 covered by the auxiliary covers 56 and 70 are not only unlikely to be heated, but also are not pressed against the shaping die 51 by the cover member 64. The covered sections therefore have lower rigidity and are softer than the other sections. That is, the reinforcing material 10 includes a first section having a first rigidity (the section that has not been covered by the auxiliary covers 56 or 70) and a second section having a second rigidity lower than the first rigidity (the covered sections that have been covered by the auxiliary covers 56 and 70). Arranging the second sections at the locations of the foamed article 19 that tend to generate abnormal noise limits generation of abnormal noise.

The shaping device 50 does not necessarily need to include at least one of the first auxiliary cover 70 and the second auxiliary covers 56. In other words, the method for shaping the reinforcing material 10 does not necessarily need to include at least one of the first auxiliary cover fixing step or the second auxiliary cover fixing step.

[Method for Measuring Delamination Strength]

The method for measuring delamination strength is now described.

Figure 13:
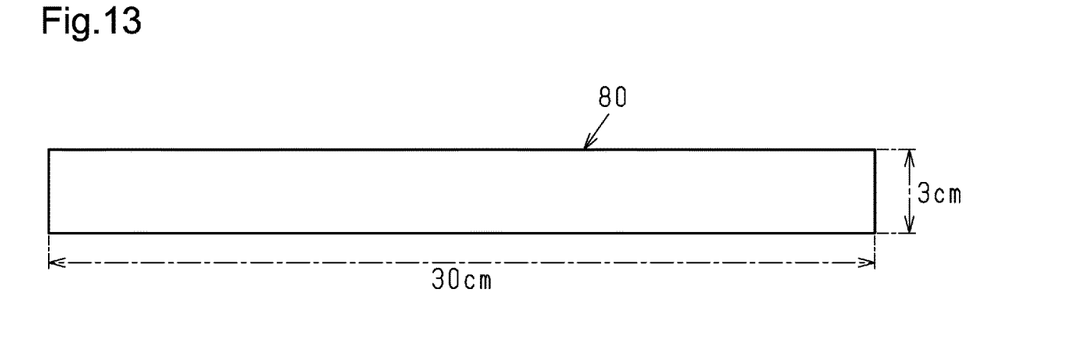
FIG. 13 is a plan view of a test piece used to measure delamination strength.

As shown in FIG. 13, a test piece 80 having a width of 3 cm and a length of 30 cm is prepared by cutting the nonwoven fabric sheet 33 (see FIG. 7). Although the width and length of the test piece 80 may be modified, it is preferable that the width be 1 cm or more.

Then, as a preparation step, a longitudinal end region of about 50 mm of the test piece 80 is delaminated. The length of the end region to be delaminated in the preparation step can be modified within a range that ensures a delamination length required for the test.

Figure 14:
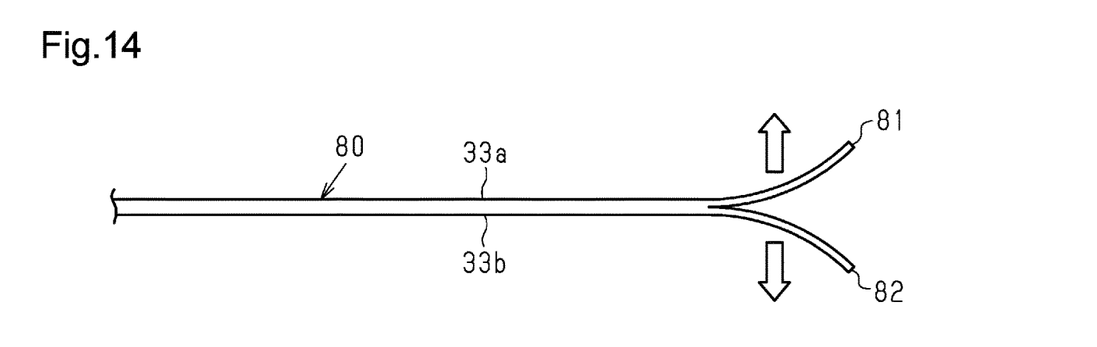
FIG. 14 is a schematic diagram showing how delamination strength is measured using the test piece of FIG. 13.

As shown in FIG. 14, "delamination" refers to peeling layers of the web of the nonwoven fabric, which have been formed into a single-layer material through needle punching, apart to separate it into a first layer 81 and a second layer 82. The first layer 81 includes a first surface 33a, and the second layer 82 includes a second surface 33b. Then, in the peeling step, the peeled first layer 81 and second layer 82 are held separately by a pull tester (not shown) to cause delamination. The maximum value of the force required for this delamination is delamination strength. In one example, the test piece 80 may be delaminated at a pulling speed of 970 mm/min for approximately 20 cm. The pulling speed and delamination length may be freely modified. Any pull tester that can measure a pulling strength may be used.

Table 1 shows the test results of delamination strength using Examples 1 to 4. Examples 1 to 4 were test pieces 80 made of nonwoven fabrics that were formed using the same webs but had mutually different punch densities. Example 2 had a higher punch density than Example 1, and Example 3 had an even higher punch density than Example 2. Example 4 had a lower punch density than example 1. The same test was conducted ten times for each example. An average of the test results of ten tests, that is, tests of the pulling forces, was obtained, and the average value was divided by 3 to convert it into a strength of a unit width (1 cm width). The value thus calculated is the delamination strength.

be obtained by conducting the test multiple times to obtain a stable value, and the number of tests may be freely modified.

Comparative Example in Table 1 was a conventional nonwoven fabric. Delamination into two layers did not occur with Comparative Example even if it was subjected to a test for delamination strength, and it was therefore not possible to obtain a value of delamination strength.

Table 1 shows the test results of the degree of seepage of Examples 1 to 4 and a Comparative Example. To measure the degree of seepage, test pieces of 30 cm×30 cm were prepared from the nonwoven fabrics of Examples 1 to 4 and the Comparative Example. Each test piece was bonded to a foam material in a test mold. Then, the proportion (%) of the area in which the foam material that seeped through the test piece was exposed was determined through visual inspection. The visual inspection was performed by multiple people, and values were determined in 5% increments.

While the degree of seepage is 80% in the conventional nonwoven fabric, the degrees of seepage in Examples 1 to 4 were 40%, 60%, 65%, and 30%, respectively, indicating that a lower delamination strength, or a lower punch density, results in a lower degree of seepage.

As a simple method for determining delamination strength, the nonwoven fabric 11 may be pinched by hand to cause delamination. In other words, a nonwoven fabric 11 that can be peeled apart into two layers when manually pulled in the thickness directions without being partially torn and with the shapes of layers maintained may be determined to have a delamination strength required for the nonwoven fabric 11. That is, a nonwoven fabric that does not have delamination strength cannot be peeled apart into two layers, and it is not possible to obtain a value of delamination strength of a nonwoven fabric that cannot be peeled apart into two layers.

Operation of the nonwoven fabric 11 (or the nonwoven fabric sheet 33) of the present disclosure is now described.

In the nonwoven fabric 11, the layers of the web 31 are bonded together with a punch density that is low enough to

TABLE 1

|  | Measurement | Example 1 | Example 2 | Example 3 | Example 4 | Comparative Example |
|---|---|---|---|---|---|---|
| Delamination | 1 | 0.072 | 0.384 | 0.510 | 0.024 | — |
| Strength | 2 | 0.060 | 0.342 | 0.330 | 0.024 | — |
| (kgf/3 cm) | 3 | 0.072 | 0.276 | 0.222 | 0.042 | — |
|  | 4 | 0.066 | 0.282 | 0.336 | 0.042 | — |
|  | 5 | 0.066 | 0.276 | 0.180 | 0.030 | — |
|  | 6 | 0.066 | 0.426 | 0.528 | 0.030 | — |
|  | 7 | 0.054 | 0.282 | 0.504 | 0.036 | — |
|  | 8 | 0.048 | 0.264 | 0.288 | 0.036 | — |
|  | 9 | 0.066 | 0.126 | 0.312 | 0.012 | — |
|  | 10 | 0.042 | 0.180 | 0.462 | 0.042 | — |
|  | Average | 0.061 | 0.284 | 0.367 | 0.032 | — |
| Delamination Strength (kgf/cm) |  | 0.020 | 0.094 | 0.122 | 0.011 | — |
| Delamination Strength (N/cm) |  | 0.200 | 0.928 | 1.200 | 0.104 |  |
| Degree of Seepage (%) |  | 40 | 60 | 65 | 30 | 80 |

As is clear from the delamination strength of Examples 1 to 4, a higher punch density enhances the bonding between the layers of the web, increasing the pulling force required for delamination. That is, a higher punch density increases the delamination strength. The delamination strengths of examples 1 to 4 are all in the range of 0.05 to 2.45 N/cm. In measuring the delamination strength, an average value may enable delamination. In other words, the nonwoven fabric 11 has a delamination strength of 0.05 to 2.45 N/cm. This nonwoven fabric 11 has fewer through-holes made by the needles 40 than a conventional nonwoven fabric in which the layers of the web are bonded together with a punch density high enough to prevent delamination. This limits passage of the foam material 17 through the nonwoven fabric 11 (reinforcing material 10) during foam-molding. Thus, the foam material 17 is less likely to be exposed or seep to the surface of the foamed article 19. As a result, rubbing between the foamed material 18 and a metal component through the reinforcing material 10 is unlikely to generate abnormal noise.

The nonwoven fabric 11 of the present disclosure has the following advantageous effects.

(1) The nonwoven fabric 11 that has a delamination strength resists passage of a foam material. Additionally, this nonwoven fabric 11 has appropriate flexibility and is a single-layer material with a low thickness of 1 to 8 mm. The nonwoven fabric 11 therefore has high formability. More specifically, the nonwoven fabric 11 stretches in a suitable manner, facilitating the operation when it is set in the mold 20 or the shaping die 51 or when it is sewn. Moreover, the nonwoven fabric 11 has high conformability with respect to the mold 20 and the die 51.

(2) The web 31 including 40% to 80% by weight of PP fibers can include a greater number of fibers than a web consisting only of PET fibers without increasing the weight. Since the nonwoven fabric 11 has a greater number of fibers than conventional fabrics, it can limit passage of the foam material 17.

(3) The PET fibers in the nonwoven fabric 11 have a core-sheath structure. The sheaths melt when heated, bonding the fibers together. At the same time, the cores, which resist melting, maintain the strength of the fibers.

(4) The surfaces 33a and 33b of the nonwoven fabric 11 are heat-treated and thus unlikely to have a nap. Only the surfaces 33a and 33b are heat-treated, and the internal fibers 33c are not affected by the heating process, thereby maintaining the flexibility of the nonwoven fabric 11. As such, the nonwoven fabric 11 has excellent processability even in a shaping process that involves heating, for example. Also, when the reinforcing material 10 is shaped by heating, the contraction increases the effect of reducing shaping creases.

(5) The reinforcing material 10 is produced by shaping the nonwoven fabric 11 with excellent processability, and is thus shaped accurately.

Modifications of Present Disclosure

The present embodiments may be modified and implemented as follows. The embodiments and the following modifications may be combined to an extent that does not cause technical contradiction.

The nonwoven fabric 11 may be shaped by sewing.

A group of needles that pierces the first surface 33a and a group of needles that pierces the second surface 33b may be arranged along the transport path of the layered material 30.

REFERENCE SIGNS LIST

10 .... Reinforcing Material; 11 .... Nonwoven Fabric, 12 .... Back Portion; 13 .... Side Portion; 14 .... Through-Hole; 15 .... Central Wrap-Around Portion; 16 .... Side Wrap-Around Portion; 17 .... Foam Material; 18 .... Foamed Material; 19 .... Foamed Article; 20 .... Mold; 21 .... Upper Mold; 22 .... Core Mold; 23 .... Lower Mold; 30 .... Layered Material; 31 .... Web; 32 .... Single-Layer Material; 33 .... Nonwoven Fabric Sheet; 33a .... First Surface; 33b .... Second Surface; 33c .... Internal Fiber; 40 .... Needle; 41 .... Projection; 42 .... First Needle Group; 43 .... Second Needle Group; 44 .... Moving Device; 45 .... Support Bed; 46 .... Calender; 47 .... Heating Roll; 48 .... Roll; 49 .... Heating Device; 50 .... Shaping Device; 51 .... Shaping Die; 51a .... Air Hole; 52 .... Cylindrical Portion; 53 .... Air Supply Leg; 54 .... Discharge Leg; 56 .... Second Auxiliary Cover; 58 .... String; 60 .... Base; 60a .... Air Supply Passage; 60b .... Discharge Passage; 61 .... Air Supply/Discharge Unit; 62 .... Air Supply Pipe; 63 .... Discharge Pipe; 64 .... Cover Member; 65 .... Closed Space; 70 .... First Auxiliary Cover; 71 .... Cover Body; 71a .... Edge Region; 72 .... Magnet; 73 .... Coupling Bar; 80 .... Test Piece; 81 .... First Layer; 82 .... Second Layer

The invention claimed is:

1. A method for producing a single-layer nonwoven fabric for molding into a single-layer reinforcing material for bonding a foamed material, the method comprising:

stacking layers of a web made of short fibers to form a stack, wherein each layer of the stack comprises a single fiber blend and includes 20% to 60% by weight of polyethylene terephthalate fibers and 40% to 80% by weight of polypropylene fibers;

processing the stack into a single-layer material made of the short fibers by bonding the short fibers together through needle punching;

applying heat treatment only to a surface of the single-layer material without heating internal fibers of the single-layer material, wherein the web includes 20% to 60% by weight of the polyethylene terephthalate fibers and 40% to 80% by weight of the polypropylene fibers, wherein the polyethylene terephthalate fibers have a core-sheath structure, and wherein the core-sheath structure includes a core and a sheath having a lower melting point than the core, wherein the single-layer nonwoven fabric has a thickness of 1 to 8 mm under a load of 7 $g/cm^2$, and wherein the single-layer nonwoven fabric has a delamination strength of 0.05 to 2.45 N/cm, and the delamination strength is a value of pulling force required to separate bonded short fibers together through the needle punching, and measuring the delamination strength, the measuring comprising conducting a test ten times, the test comprising:

a first preparation step of preparing an elongate test piece that is made of the single-layer nonwoven fabric and has a width of 3 cm;

a second preparation step of peeling the stacked layers of the single-layer nonwoven fabric to separate bonded short fibers together through the needle punching into a first layer and a second layer in a longitudinal end region of the test piece, thereby delaminating the end region;

a peeling step of holding the peeled first layer and second layer separately by a pull tester to delaminate a section of the test piece that is continuous with the end region at a pulling speed of 970 mm/min for approximately 20 cm; and a measuring step of measuring a maximum value of a force required for the delamination in the peeling step, and an average of the maximum values of the test conducted ten times is the delamination strength.

\* \* \* \* \*